No. 41,175. PATENTED JAN. 5, 1864.
J. CHRISTL.
CONSTRUCTING FLAT CHAINS FOR BRACELETS.
Fig. 1.
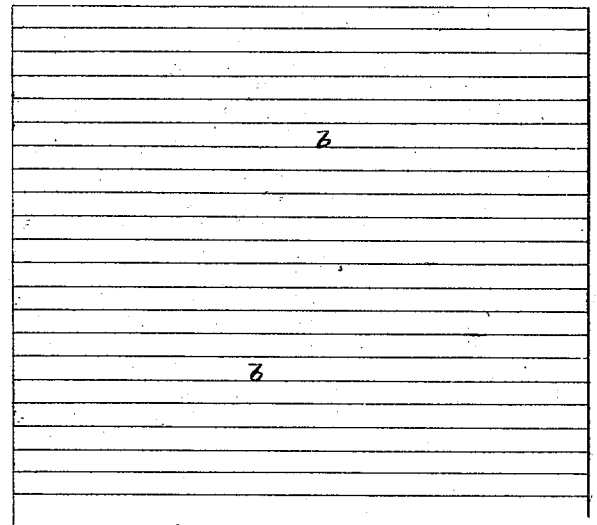
Fig. 2.
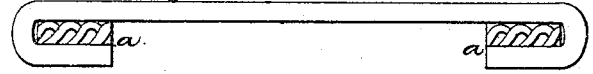
Fig. 4.
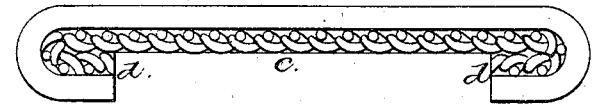
Fig. 3.
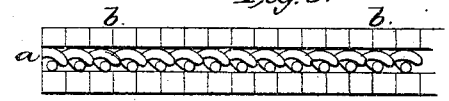
Fig. 6. Fig. 5.
 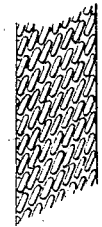
Witnesses:
Inventor:
Josef Christl

UNITED STATES PATENT OFFICE.

JOSEF CHRISTL, OF NEWARK, NEW JERSEY.

IMPROVEMENT IN CONSTRUCTING FLAT CHAINS FOR BRACELETS.

Specification forming part of Letters Patent No. 41,175, dated January 5, 1864.

*To all whom it may concern:*

Be it known that I, JOSEF CHRISTL, of Newark, in the State of New Jersey, have invented a new and useful Improvement in the Construction of Flat Chains for Bracelets and other Jewelry; and I do hereby declare that the following is a full, clear, and exact description thereof, reference being had to the accompanying drawings, making part of this specification, in which—

Figure 1 is a face view of such improved chain; Fig. 2, a cross-section, and Fig. 3 a longitudinal section, thereof; and Fig. 4, a cross-section of a modification. All the drawings are represented on an enlarged scale.

That my said invention may be clearly understood and distinguished from other things before known, I will in the first place describe the manner in which flat chains for this purpose have heretofore been constructed, referring for this purpose to Figs. 5 and 6 of the accompanying drawings.

In the first place fine wire is coiled in the form of helices, and after a number of these have been formed they are interlocked by screwing one into the other, as represented in Fig. 5, and drawn as far apart as practicable, as shown in the said figure, and in that condition they are flattened by being passed between rollers to bring them into the condition represented in Fig. 6, and in this condition the chain is formed into bracelets and other ornamental articles.

In making my improved chains I use chains formed as above described. I take two narrow chains, $a$ $a$, and connect them by a series of cross-bars, $b$, formed with parallel edges by bending the ends around and securing them to the two chains $a$ $a$, placing the edges of the cross-bars $b$ in contact. The chain thus formed can be made with much less labor, is stronger, quite as flexible, and can be ornamented more readily than when constructed as heretofore.

Instead of using the cross-bars $b$ to connect two narrow chains, $a$ $a$, as above described, I make a chain in the manner first above described of a series of helices, as represented at $c$, Fig. 4, making it thicker along the edges, so as to form longitudinal beads $d$ $d$, and then I cover such chain with a series of parallel bars bent around the edges and over the beads $d$ $d$, and secure them in place. The chain when made as last described will be stronger and more massive than when made according to the example represented in Figs. 1, 2, and 3.

What I claim as my invention, and desire to secure by Letters Patent in the construction of ornamental chains for bracelets and other articles of jewelry, is—

The combination of the cross-bars with the chain or chains to which they are attached, and which are made substantially as herein described.

JOSEF CHRISTL.

Witnesses:
WM. H. BISHOP,
A. DE LACY.